(12) United States Patent
Kim et al.

(10) Patent No.: US 10,194,374 B2
(45) Date of Patent: Jan. 29, 2019

(54) NETWORK JOIN METHOD AND NETWORK DEVICE USING THE NETWORK JOIN METHOD

(71) Applicant: ELECTRONICS AND TELECOMMUNICATIONS RESEARCH INSTITUTE, Daejeon (KR)

(72) Inventors: Kyeong Tae Kim, Daejeon (KR); Bum Ho Kim, Daejeon (KR); Sang Cheol Kim, Daejeon (KR); Seon-Tae Kim, Daejeon (KR); Hae Yong Kim, Daejeon (KR); Yu Seung Ma, Daejeon (KR); Pyeong Soo Mah, Daejeon (KR); Gyu Sang Shin, Daejeon (KR); Duk Kyun Woo, Daejeon (KR); Jeong-Woo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 18 days.

(21) Appl. No.: 15/207,417

(22) Filed: Jul. 11, 2016

(65) Prior Publication Data

US 2017/0257814 A1 Sep. 7, 2017

(30) Foreign Application Priority Data

Mar. 2, 2016 (KR) .................. 10-2016-0025177

(51) Int. Cl.
*H04W 8/00* (2009.01)
*H04W 24/02* (2009.01)
(Continued)

(52) U.S. Cl.
CPC ......... *H04W 40/244* (2013.01); *H04W 8/005* (2013.01); *H04W 24/02* (2013.01);
(Continued)

(58) Field of Classification Search
CPC ... H04W 24/02; H04W 40/12; H04W 40/244; H04W 40/246; H04W 52/0216;
(Continued)

(56) References Cited

U.S. PATENT DOCUMENTS 7,222,175 B2 * 5/2007 Knauerhase .......... H04W 16/06
709/225
7,298,716 B2 * 11/2007 Abraham .......... H04W 52/0232
370/321
(Continued)

FOREIGN PATENT DOCUMENTS

KR 20020004617 A * 1/2002
KR 1020130139761 A 12/2013
(Continued)

*Primary Examiner* — Eric Nowlin (57) ABSTRACT

There is provided a network join method including transmitting a long beacon message including transmission timing information of a first short beacon message to a child node network device, transmitting a first short beacon message including information regarding an interval in which it is possible to transmit a message, to the child node network device according to a transmission timing of the first short beacon message, receiving a slot allocation request message from the child node network device according to the interval in which it is possible to transmit a message, and checking whether the child node network device joins a network, and transmitting a slot allocation confirmation message to the child node network device.

12 Claims, 4 Drawing Sheets (51) Int. Cl.
| | |
|---|---|
| H04W 40/12 | (2009.01) |
| H04W 40/24 | (2009.01) |
| H04W 48/12 | (2009.01) |
| H04W 72/04 | (2009.01) |
| H04W 76/12 | (2018.01) |
| H04W 84/20 | (2009.01) |
| H04W 76/10 | (2018.01) |

(52) U.S. Cl.
CPC ........... *H04W 40/12* (2013.01); *H04W 48/12* (2013.01); *H04W 72/0446* (2013.01); *H04W 76/10* (2018.02); *H04W 84/20* (2013.01)

(58) Field of Classification Search
CPC . H04W 72/0446; H04W 74/00; H04W 76/02; H04W 84/12; H04W 88/08; H04W 48/16
See application file for complete search history.

(56) References Cited

U.S. PATENT DOCUMENTS

| | | | | |
|---|---|---|---|---|
| 7,382,757 B2* | 6/2008 | LoGalbo | ............... | H04W 88/08 370/338 |
| 7,433,669 B2* | 10/2008 | Rue | ......... | H04L 12/12 455/343.2 |
| 7,477,621 B1* | 1/2009 | Loc | ......... | H04W 28/20 370/329 |
| 7,616,617 B2* | 11/2009 | Pandey | ................ | H04W 48/12 370/328 |
| 7,706,337 B2* | 4/2010 | Pandey | ............... | H04W 40/246 370/328 |
| 7,920,545 B2* | 4/2011 | Eguchi | ................ | H04W 56/00 370/350 |
| 8,144,670 B2* | 3/2012 | Shin | ................. | H04W 72/0406 370/229 |
| 8,149,794 B2* | 4/2012 | Shin | ................. | H04W 72/0413 370/336 |
| 8,218,495 B2* | 7/2012 | Cho | ..................... | H04W 72/042 370/330 |
| 8,223,662 B2* | 7/2012 | Deshpande | ....... | H04W 52/0216 370/252 |
| 8,305,946 B2* | 11/2012 | Kubo | ..................... | H04L 12/12 370/311 |
| 8,400,960 B2* | 3/2013 | Hiertz | ................ | H04W 74/02 370/328 |
| 8,804,590 B2* | 8/2014 | Nakae | ................ | H04W 48/12 370/311 |
| 8,830,986 B2* | 9/2014 | Sakoda | ................ | H04W 48/08 370/350 |
| 9,060,349 B2* | 6/2015 | Seok | ..................... | H04W 74/08 |
| 9,107,229 B2* | 8/2015 | Choudhury | ....... | H04W 72/0446 |
| 9,204,368 B2* | 12/2015 | Chen | ................ | H04W 74/0816 |
| 9,210,656 B2* | 12/2015 | Mannemala | ...... | H04W 52/0216 |
| 9,210,720 B2* | 12/2015 | Abraham | ............... | H04W 52/02 |
| 9,232,469 B2* | 1/2016 | Chu | ................. | H04W 52/0219 |
| 9,265,044 B2* | 2/2016 | Sakoda | ................ | H04W 48/08 |
| 9,282,511 B2* | 3/2016 | Kim | ................. | H04W 52/0216 |
| 9,282,515 B2* | 3/2016 | Joo | ................... | H04W 52/0216 |
| 9,292,864 B2* | 3/2016 | Qi | ....................... | G06Q 30/0267 |
| 9,307,444 B2* | 4/2016 | Wang | ................. | H04L 69/04 |
| 9,408,166 B2* | 8/2016 | Gong | ................. | H04W 56/001 |
| 9,661,614 B2* | 5/2017 | Manthiramoorthy | ........................ | H04W 72/0406 |
| 9,743,421 B2* | 8/2017 | Konopacki, Jr. | ......................... | H04W 72/0446 |
| 9,854,469 B2* | 12/2017 | Wang | ................ | H04W 28/0278 |
| 9,854,565 B2* | 12/2017 | Manthiramoorthy | ........................ | H04W 72/0406 |
| 9,888,490 B2* | 2/2018 | Wang | ................ | H04W 71/1263 |
| 9,900,826 B2* | 2/2018 | Amini | ................ | H04W 40/244 |
| 9,913,219 B2* | 3/2018 | Gong | ..................... | G06F 1/3209 |
| 9,924,444 B2* | 3/2018 | Jiang | ..................... | H04W 48/06 |
| 9,930,693 B2* | 3/2018 | Lee | ..................... | H04W 72/0446 |
| 2003/0163579 A1* | 8/2003 | Knauerhase | ......... | H04W 16/06 709/230 |
| 2005/0009512 A1* | 1/2005 | Rue | ......... | H04L 12/12 455/420 |
| 2005/0117530 A1* | 6/2005 | Abraham | ......... | H04W 52/0232 370/310 |
| 2006/0089964 A1* | 4/2006 | Pandey | ................ | H04W 40/246 709/203 |
| 2006/0251017 A1* | 11/2006 | Bishop | ................ | H04B 7/2693 370/330 |
| 2007/0280184 A1* | 12/2007 | Shin | ................ | H04W 72/0413 370/338 |
| 2007/0280237 A1* | 12/2007 | Shin | ................ | H04W 72/0406 370/390 |
| 2008/0002633 A1* | 1/2008 | Pandey | ................ | H04W 48/12 370/338 |
| 2009/0022111 A1* | 1/2009 | Cho | .................... | H04W 72/042 370/336 |
| 2010/0085930 A1* | 4/2010 | Shin | ................ | H04W 72/1278 370/329 |
| 2010/0157955 A1* | 6/2010 | Liu | .................... | H04W 72/0446 370/336 |
| 2010/0260084 A1* | 10/2010 | Imamura | .......... | H04W 52/0216 370/311 |
| 2012/0127965 A1* | 5/2012 | Benveniste | ............. | H04L 47/14 370/336 |
| 2012/0182915 A1* | 7/2012 | Wentink | ............ | H04W 52/0216 370/311 |
| 2012/0307702 A1* | 12/2012 | Nakae | ................... | H04W 48/12 370/311 |
| 2013/0070582 A1* | 3/2013 | Joo | .................... | H04W 52/0216 370/216 |
| 2013/0208637 A1* | 8/2013 | Abraham | ............... | H04W 52/02 370/311 |
| 2013/0250832 A1* | 9/2013 | Kim | ................... | H04W 52/0216 370/311 |
| 2013/0287010 A1* | 10/2013 | Chen | ..................... | H04W 48/10 370/338 |
| 2013/0346207 A1* | 12/2013 | Qi | ....................... | G06Q 30/0267 705/14.64 |
| 2014/0003414 A1* | 1/2014 | Choudhury | ......... | H04W 74/006 370/347 |
| 2014/0036746 A1* | 2/2014 | Mannemala | ...... | H04W 52/0216 370/311 |
| 2014/0036887 A1* | 2/2014 | Sakoda | ................ | H04W 48/08 370/336 |
| 2014/0078949 A1* | 3/2014 | Chu | ..................... | H04W 52/0219 370/311 |
| 2014/0105037 A1* | 4/2014 | Manthiramoorthy | ........................ | H04W 72/0406 370/252 |
| 2014/0153415 A1* | 6/2014 | Choudhury | ....... | H04W 72/0446 370/252 |
| 2014/0177605 A1* | 6/2014 | Kwon | ............... | H04W 72/1289 370/336 |
| 2014/0192713 A1* | 7/2014 | Park | ..................... | H04B 7/2656 370/328 |
| 2014/0269317 A1* | 9/2014 | Wang | ..................... | H04L 69/04 370/235 |
| 2014/0369248 A1* | 12/2014 | Manthiramoorthy | ........................ | H04W 72/0406 370/311 |
| 2014/0376537 A1* | 12/2014 | Manthiramoorthy | ........................ | H04W 72/0406 370/338 |
| 2015/0078229 A1* | 3/2015 | Choi | ................... | H04W 56/001 370/311 |
| 2015/0081474 A1* | 3/2015 | Kostka | .................... | H04W 4/21 705/26.8 |
| 2015/0085849 A1* | 3/2015 | Kim | ..................... | H04W 24/02 370/338 |
| 2015/0098459 A1* | 4/2015 | Lee | ..................... | H04W 48/14 370/338 |
| 2015/0163828 A1* | 6/2015 | Vandwalle | .......... | H04W 52/383 370/330 |
| 2015/0173015 A1* | 6/2015 | Lee | ................... | H04W 52/0216 370/311 |

(56) References Cited

U.S. PATENT DOCUMENTS

| | | | |
|---|---|---|---|
| 2015/0223169 A1* | 8/2015 | Ghosh | H04W 52/0216 370/311 |
| 2015/0245292 A1* | 8/2015 | Jeong | H04W 52/0222 370/311 |
| 2016/0021615 A1* | 1/2016 | Gong | G06F 1/3209 370/311 |
| 2016/0165597 A1* | 6/2016 | Konopacki, Jr. | H04W 72/0446 370/329 |
| 2016/0234807 A1* | 8/2016 | Levy | H04W 56/00 |
| 2016/0269971 A1* | 9/2016 | Kim | H04W 16/14 |
| 2016/0286485 A1* | 9/2016 | Li | H04W 52/0216 |
| 2016/0309393 A1* | 10/2016 | Amini | H04W 40/244 |
| 2017/0046237 A1* | 2/2017 | Clay | G06F 11/2007 |
| 2017/0118754 A1* | 4/2017 | Kang | H04W 8/005 |
| 2017/0134145 A1* | 5/2017 | Xin | H04L 1/0009 |
| 2017/0135120 A1* | 5/2017 | Hiremath | H04W 72/12 |
| 2017/0142652 A1* | 5/2017 | Liu | H04W 4/021 |
| 2017/0150419 A1* | 5/2017 | Li | H04B 7/024 |
| 2017/0171819 A1* | 6/2017 | Irony | H04W 52/0229 |
| 2017/0201940 A1* | 7/2017 | Koratekere Honnappa | H04W 52/0206 |
| 2017/0238239 A1* | 8/2017 | Ong | H04W 48/18 370/338 |
| 2017/0238250 A1* | 8/2017 | Guo | H04W 52/0216 370/311 |
| 2017/0265130 A1* | 9/2017 | Kakani | H04W 48/10 |
| 2017/0353925 A1* | 12/2017 | Trainin | H04W 52/0216 |
| 2018/0145732 A1* | 5/2018 | Shen | H04B 7/0617 |
| 2018/0152965 A1 | 5/2018 | Jeong et al. | |
| 2018/0199286 A1* | 7/2018 | Ghosh | H04W 52/0216 |
| 2018/0227982 A1* | 8/2018 | Singamsetty | H04W 84/18 |

FOREIGN PATENT DOCUMENTS

| | | | | |
|---|---|---|---|---|
| KR | 10-2014-0009040 A | 1/2014 | | |
| KR | 1020140008261 A | 1/2014 | | |
| KR | 10-2015-0131585 A | 11/2014 | | |
| KR | 10-2015-0000474 A | 1/2015 | | |
| KR | 10-2015-0085092 A | 7/2015 | | |
| WO | WO 2013/009776 A2 | 1/2013 | | |
| WO | WO 2013052077 A1 * | 4/2013 | | H04B 7/2656 |
| WO | WO 2013/130998 A1 | 9/2013 | | |
| WO | WO-2015188374 A1 * | 12/2015 | | H04W 16/28 |

* cited by examiner

NETWORK JOIN METHOD AND NETWORK DEVICE USING THE NETWORK JOIN METHOD

CROSS-REFERENCE TO RELATED APPLICATION

This application claims priority to and the benefit of Korean Patent Application No. 10-2016-0025177, filed on Mar. 2, 2016, in the Korean Intellectual Property Office, the entire contents of which are incorporated herein by reference in their entirety.

BACKGROUND

1. Field

An embodiment of the present invention relates to a network join method and a network device using the method.

2. Description of the Related Art

Wireless sensor network technologies for industrial Internet of things (IoT) were developed on the basis of IEEE (Institute of Electrical and Electronics Engineers) 802.15.4 standard as a wireless personal area network (WPAN) transmission standard. Also, ZigBee, ISA100.11a, wireless highway addressable remote transducer protocol (HART), and the like, defining higher layer communication exist as wireless sensor network technologies according to demand of related industries based on IEEE 802.15.4 standard.

SUMMARY

An embodiment of the present invention relates to a method for enabling first booted child node network devices to quickly join even a large network simultaneously by using an adaptive beacon scheduling method.

An embodiment of the present invention also relates to a method for adaptively adjusting a period and the number of beacon messages according to a network situation in order to solve a bottleneck phenomenon that occurs in a process in which a large number of node network devices join an Internet of things (IoT) wireless network for an industrial purpose.

An embodiment of the present invention also relates to a method for dynamically allocating a transmission and reception schedule of beacon messages according to quality of service (QoS).

An embodiment of the present invention also relates to a scheduling method capable of operating a network according to QoS, as well as enabling every node network device to quickly participate in a network in a large IoT environment.

Technical subjects of the present invention that may be obtained in the present invention are not limited to the foregoing technical subjects and any other technical subjects not mentioned herein may be easily understood by a person skilled in the art from the present disclosure and accompanying drawings.

A network join method according to an embodiment of the present invention includes transmitting a long beacon message including transmission timing information of a first short beacon message to a child node network device; transmitting a first short beacon message including information regarding an interval in which it is possible to transmit a message, to the child node network device according to a transmission timing of the first short beacon message; receiving a slot allocation request message from the child node network device according to the interval in which it is possible to transmit a message; and checking whether the child node network device joins a network, and transmitting a slot allocation confirmation message to the child node network device.

The slot allocation request message may be included in a child node beacon message received from the child node network device.

The slot allocation confirmation message may be included in a second short beacon message transmitted to the child node network device.

The method may further include determining transmission timing information of the first short beacon message according to quality of service (QoS) of a network.

The method may further include determining the interval in which it is possible to transmit a message according to QoS of a network.

The method may further include: receiving a slot deallocation request message from the child node network device according to the interval in which it is possible to transmit a message; and checking whether the child node network device is released from network join and transmitting a slot deallocation confirmation message to the child node network device.

A network join method according to another embodiment of the present invention includes: receiving a long beacon message including transmission timing information of a first short beacon message from a parent node network device; receiving a first short beacon message including information regarding an interval in which it is possible to transmit a message from the parent node network device according to a transmission timing of the first short beacon message; transmitting a slot allocation request message to the parent node network device according to the interval in which it is possible to transmit a message; and receiving a slot allocation confirmation message including information regarding network join from the parent node network device.

The slot allocation request message may be included in a child node beacon message transmitted to the parent node network device.

The slot allocation confirmation message may be included in a second short beacon message received from the parent node network device.

Transmission timing information of the first short beacon message may be determined according to quality of service (QoS) of a network.

The interval in which it is possible to transmit a message may be determined according to QoS of a network.

The method may further include: transmitting a slot deallocation request message to the parent node network device according to the interval in which it is possible to transmit a message; and receiving a slot deallocation confirmation message including information regarding whether network join is released from the parent node network device.

A network device according to another embodiment of the present invention includes: a communication unit configured to transmit and receive a message to and from a different network; and a controller configured to control a network device, wherein the controller controls to transmit a long beacon message including transmission timing information of a first short beacon message to a child node network device, transmit a first short beacon message including information regarding an interval in which it is possible to transmit a message to the child node network device according to a transmission timing of the first short beacon message, receive a slot allocation request message from the child node network device according to the interval in which it is possible to transmit a message, check whether the child node network device join a network, and transmit a slot allocation confirmation message to the child node network device.

The controller may determine transmission timing information of the first short beacon message according to quality of service (QoS) of a network, and determine an interval in which it is possible to transmit a message according to QoS of a network.

According to the embodiment of the present invention, it is possible to provide the method for enabling first booted child node network devices to quickly join even a large network simultaneously by using an adaptive beacon scheduling method.

Also, according to the embodiment of the present invention, it is possible to provide the method for adaptively adjusting a period and the number of beacon messages according to a network situation in order to solve a bottleneck phenomenon that occurs in a process in which a large number of node network devices join an Internet of things (IoT) wireless network for an industrial purpose.

Also, according to the embodiment of the present invention, it is possible to provide the method for dynamically allocating a transmission and reception schedule of beacon messages according to quality of service (QoS).

Also, according to the embodiment of the present invention, it is possible to provide the scheduling method capable of operating a network according to QoS, as well as enabling every node network device to quickly participate in a network in a large IoT environment.

Advantages and effects of the present invention that may be obtained in the present invention are not limited to the foregoing effects and any other technical effects not mentioned herein may be easily understood by a person skilled in the art from the present disclosure and accompanying drawings.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Hereinafter, embodiments of the present invention will be described in detail with reference to the accompanying drawings.

In describing the present invention, if an embodiment has been well known in the art to which the present invention pertains and technical contents is not directly related to an embodiment of the present disclosure, descriptions thereof will be omitted. This is to allow the embodiment of the present invention to be clearly understood without obscuring the gist of the embodiment of the present disclosure.

It is to be understood that when one element is referred to as being "connected to" or "coupled to" another element, it may be connected directly to or coupled directly to another element or be connected to or coupled to another element, having the other element intervening therebetween. In addition, in the following description, and the word 'including' does not preclude the presence of other components and means that an additional component is included in the technical concept of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

Also, elements of the embodiments of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

In describing embodiments of the present invention, a detailed description of known techniques associated with the present invention unnecessarily obscures the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

An IEEE (Institute of Electrical and Electronics Engineers) 802.15.4 standard for Internet of things (IoT) for industrial purposes was proposed as a low power/low cost short-range wireless network. However, the IEEE 802.15.4 standard has problems such as transmission delay, a limitation in securing reliability, restriction in peer-to-peer communication, and lack of low power operation method suitable for various service quality.

Thus, recently, 15.4e, g, k, m, 15.8 standards of weightless v1.0, IEEE 802 are considered in order to consider requirements such as ITU-R: International Telecommunication Union Radio communication Sector) M.2002/M.2224 and satisfy a communication distance of about 1 kilometer or longer, reliable communication in a shadow area, low power for battery lifespan of 10 years or longer, and minimum infrastructure technique requirements by overcoming an existing IEEE 802.15.4 technology.

On the other hand, in a wireless network based on IEEE 802.15.4 standard, in order for a booted node network device, that is, a child node network device to join an existing network, a beacon message should be received. The beacon message may include control information required for a wireless personal area network (WPAN) coordinator or a parent node network device to transmit and receive wireless data to and from the booted child node network device that wants to newly participate. For example, the control information may include information such as when the child node network device is to wake up or asleep, in how the child node network device and the parent node network device are to transmit data (for example, CSMA/CA (Carrier Sense Multiple Access/Collision Avoidance), TDMA (Time Division Multiple Access), or FDMA (Frequency Time Division Multiple Access)), which of parent node network devices the child node network device is to join, or at which a timing the child node network device and the parent node network device are to transmit and receive data.

According to the IEEE 802.15.4e standard, a parent node network device periodically transmits a beacon message, and a child node network device that receives the beacon message may join a network according to a timing and a procedure described in the beacon message. Also, the child node network device may transmit a beacon message of its own in order to inform an existing network about the presence of the child node network device.

Figure 1:
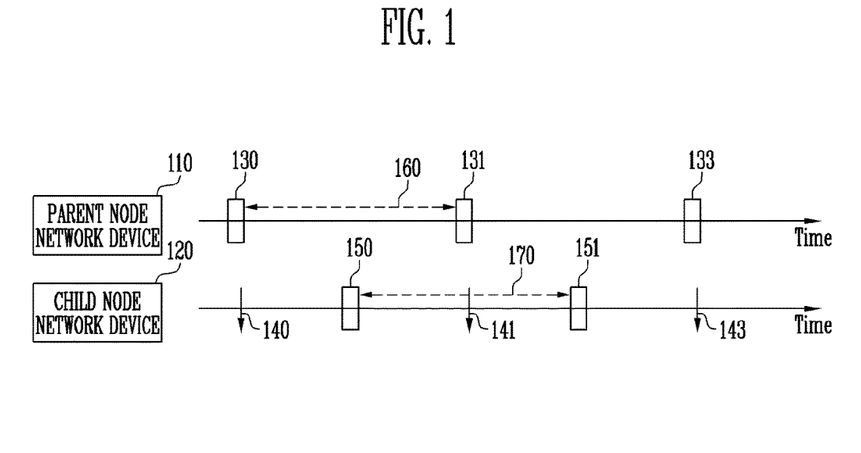
FIG. 1 is a view illustrating an example of timings of transmission and reception of beacon messages.

FIG. 1 is a view illustrating an example of timings of transmission and reception of beacon messages.

Referring to FIG. 1, timings of transmission and reception of beacon messages 130, 131, 133, 150, and 151 between a parent node network device 110 and a child node network device 120. At this time, the parent node network device 110 may be called a sender or a transmission network device, and may designate a network device which is already connected to an existing network and to which the child node network device 120 may be connected. The child node network device 120 may be called a receiver or a reception network device and may designate a network device which is connected to the parent node network 110 to receive data from a network or transmit data to the network.

The parent node network device 110 may periodically transmit first beacon messages 130, 131 and 133 at every preset first beacon interval 160. The child node network device 120 may receive the first beacon messages 130, 131, and 133 as indicated by 140, 141, and 143. The child node network device 120 may attempt to connect to the parent node network device 110 according to control information included in the first beacon messages 130, 131, and 133. At this time, the control information may include control information required for the parent node network device 110 to transmit and receive wireless data to and from the child node network device 120 that wants to newly join the network as described above.

Thereafter, the child node network device 120 may periodically transmit second beacon messages 150 and 151 to a neighbor node network device ((for example, the parent node network device 110) through a shared slot (for example, a link through which the parent node network device 110 and the child node network device 120 may simultaneously transmit and/or receive a message) at every second preset beacon interval 170. Or, the child node network device 120 may allocate a special channel to transmit the second beacon messages 150 and 151 to the parent node network device 110 at every second preset beacon interval 170.

On the other hand, when the parent node network device 110 receives a (2-1)th beacon message 150 from the child node network device 120, the parent node network device 110 may parse the received (2-1)th beacon message 150. The parent node network device 110 may generate a (1-2)th beacon message 131 reflecting scheduling information and transmit the (1-2)th beacon message 131 to the child node network device 120 according to the first beacon interval 160.

That is, when the network join request (that is, the (2-1)th beacon message 150) of the child node network device 120 that has newly joined the network is received, the parent node network device 110 follows a procedure of waiting for a scheduling result by the first beacon interval 160 and then informing through the (1-2)th beacon message 131.

However, when a plurality of child node network devices 120 boot and periodically transmit and receive the beacon messages 130, 131, 133, 150, and 151 to and from the parent node network device 110 in a large wireless network, a large number of packet collisions occur to cause a bottleneck phenomenon. This may degrade network performance, as well as delaying a network join time of the child node network device 120.

Therefore, hereinafter, a method for enabling first booted child node network devices to quickly join even a large network simultaneously by using an adaptive beacon scheduling method will be described. Also, a method for dynamically allocating a transmission and reception schedule of beacon messages according to quality of service (QoS) (for example, a path minimizing latency, a routing path maximizing reliability, or a routing path minimizing energy consumption) will be described.

Figure 2:
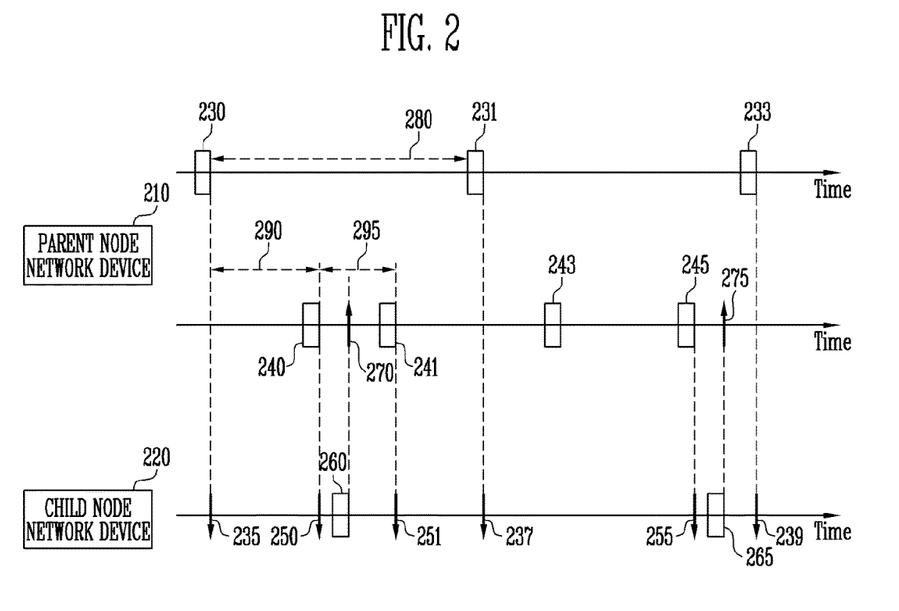
FIG. 2 is a view illustrating timings of transmission and reception of beacon messages according to an embodiment of the present invention.

FIG. 2 is a view illustrating timings of transmission and reception of beacon messages according to an embodiment of the present invention.

Referring to FIG. 2, network devices 210 and 220 according to an embodiment of the present invention may include a parent node network device 210 and a child node network device 220. The parent node network device 210 may transmit two types of beacon message to the child node network device 220. One of the two types of beacon message is long beacon messages 230, 231, and 233, and the other is short beacon messages 240, 241, 243, and 245. The short beacon messages 240, 241, 243, and 245 are beacon messages irregularly transmitted at a long beacon interval 280 of the long beacon messages 230, 231, and 233.

The parent node network device 210 may periodically transmit the long beacon messages 230, 231, and 233 at every preset beacon interval 280. The child node network device 220 may receive the long beacon messages 230, 231, and 233 as indicated by 235, 237, and 239.

At this time, similar to the first beacon messages 130, 131, and 133 illustrated in FIG. 1, the long beacon messages 230, 231, and 233 may include control information required for the parent node network device 210 to transmit and received data to and from the child node network device 220 that wants to newly join a network. For example, the long beacon messages 230, 231, and 233 may include information such as when the child node network device 220 is to wake up or asleep, in how the child node network device 220 and the parent node network device 210 are to transmit data (for example, CSMA/CA, TDMA, or FDMA), which of parent node network devices 210 the child node network device 220 is to join, or at which a timing the child node network device 220 and the parent node network device 210 are to transmit and receive data.

Also, according to an embodiment, the long beacon messages 230, 231, and 233 may further include topology information of a neighbor node network device adjacent to the parent node network device 210 that transmits the long beacon messages 230, 231, and 233. The topology information is information regarding a connection form of network equipment participating in communication. For example, the long beacon messages 230, 231, and 233 may include topology information of neighbor network devices adjacent to the parent node network device 210 within two hops.

At this time, when the long beacon messages 230, 231, and 233 including the topology information are received, the child node network device 220 may perform effective scheduling negotiation by inferring a relationship of a child node network device (not shown) having relation with the child node network device 220 and/or a parent node network device 210 and/or a child node network device (not shown) having relation with the parent node network device 210 with reference to the topology information. For example, the child node network device 220 may minimize a transmission delay time by reducing the number of data transmissions through data aggregation or minimizing routing transmission order.

Meanwhile, the long beacon messages 230, 231, and 233 generated and transmitted by the parent node network device 210 according to an embodiment of the present invention may include information regarding a transmission timing of the short beacon messages 240, 241, 243, and 245 to be transmitted after the long beacon messages 230, 231, and 233. For example, the first long beacon message 230 may include information regarding a transmission timing of the first short beacon message 240 and a transmission timing of the second short beacon message 241, and the second long beacon message 231 may include a transmission timing of the third short beacon message 243 and a transmission timing of the fourth short beacon message 245.

Or, according to an embodiment, the long beacon messages 230, 231, and 233 may include information regarding a transmission timing of the short beacon messages 240, 241, 243, and 245 to be transmitted immediately after the long beacon messages 230, 231, and 233. The short beacon messages 240, 241, 243, and 245 may include information regarding a transmission timing of the short beacon messages 240, 241, 243, and 245 to be transmitted immediately after the short beacon messages 240, 241, 243, and 245. For example, the first long beacon message 230 may include information regarding a transmission timing of the first short beacon message 240, the first short beacon message 240 may include information regarding a transmission timing of the second short beacon message. The second long beacon message 231 may include information regarding a transmission timing of the third short beacon message 243, and the third short beacon message 243 may include information regarding a transmission timing of the fourth short beacon message 245.

FIG. 2 illustrates that two short beacon messages 240 and 241 and 243 and 245 are transmitted between times at which the first long beacon message 230 and the second long beacon message 231 are transmitted or between times at which the second long beacon message 231 and the second long beacon message 233 are transmitted, that is, at the long beacon interval 280, but the present invention is not limited thereto. For example, three or more short beacon messages may be transmitted between the first long beacon message 230 and the second long beacon message 231. At this time, the short beacon messages 240 and 243 transmitted immediately after the long beacon messages 230, 231, and 233 may include information regarding transmission timings of all the short other beacon messages 241 and 245 to be transmitted at the long beacon interval 280. Or, the short beacon messages 240, 241, 243, and 245 may include information regarding transmission timing of the short beacon messages 241 and 245 to be transmitted immediately after the short beacon messages 240, 241, 243, and 245. For example, the first short beacon message 240 may include all the information regarding transmission timings of two short beacon messages to be transmitted after the first short beacon message 240. Or, according to an embodiment, the first short beacon message 240 may include information regarding a transmission timing of the second short beacon message 241, and the second short beacon message 241 may include information regarding a transmission timing of a short beacon message (not shown) to be transmitted immediately after the second short beacon message 241.

Thus, the short beacon messages 240, 241, 243, and 245 may be irregularly transmitted between times at which the long beacon messages 230, 231, and 233 are transmitted, and may be control messages with a data length shorter than that of the long beacon messages 230, 231, and 233.

At this time, the child node network device 220 may receive the short beacon messages 240, 241, 243, and 245 as indicated by 250, 251, and 255. On the other hand, the child node network device 220 may not receive all the short beacon messages 2400, 241, 243, and 245 and may receive the short beacon messages 240, 241, 243, and 245 only when there is a message to be transmitted to the parent node network device 210. For example, as illustrated in FIG. 2, when there is no message to be transmitted to the parent node network device 210, the child node network device 220 may not receive the third short beacon message 243.

The short beacon messages 240, 241, 243, and 245 may include scheduling negotiation information regarding when the parent node network device 210 and the child node network device 220 are to exchange data.

That is, the parent node network device 210 may have a network join negotiation with a plurality of child node network devices 220 through the plurality of short beacon messages 240, 241, 243, and 245 at the long beacon interval 280 between the long beacon messages 230, 231, and 233.

On the other hand, the child node network device 220 may transmit a slot allocation request message including information for requesting slot allocation from the parent node network device 210 to the parent node network device 210 in order to join the parent node network device 210. At this time, the slot allocation request message may be included in a first child node beacon message 260 transmitted by the child node network device 220 to the parent node network device 210.

For this purpose, the parent node network device 210 may include information regarding a timing at which the child node network device 220 transmits the slot allocation request message in the short beacon messages 240, 241, 243, and 245, and transmit the short beacon messages 240, 241, 243, and 245. That is, the parent node network device 210 may include information regarding when a message collision may be avoided and that the slot allocation request message may be transmitted at the time, in the short beacon messages 240, 241, 243, and 245, and transmit the short beacon messages 240, 241, 243, and 245. At this time, the information regarding the timing at which the slot allocation request message may be transmitted may be included as a free slot list in the short messages 240, 241, 243, and 245. The free slot list may include time information regarding a slot in which the child node network device 220 may transmit a message to the parent node network device 210 without a message collision.

When the child node network device 220 receives the short beacon messages 240, 241, 243, and 245 including the free slot list, the child node network device 220 may transmit a first child node beacon message 260 including the slot allocation request message to the parent node network device 210 in an interval in which it is possible to transmit a message without a message collision.

For example, the first short beacon message 240 is received as indicated by 250, the child node network device 220 may check an interval in which it is possible to transmit a message without a message collision according to the free slot list. Also, the child node network device 220 may transmit the first child node beacon message 260 including the slot allocation request message to the parent node network device 210 at the interval without a message collision.

After the first child node beacon message 260 is transmitted, the child node network device may receive a second short beacon message 241 transmitted from the parent node network device 210 and check a network join negotiation result.

In more detail, the parent node network device 210 may receive the first child node beacon message 260 as indicated by 270, and analyze the slot allocation request information to determine whether network joining of the child node network device 220 is permitted. Also, the parent node network device 210 may include a slot allocation confirmation message including information regarding a slot allocation in a second short beacon message 241 and transmit the second short beacon message to the child node network device 220. The slot allocation confirmation message may include information regarding whether the slot allocation request is approved or rejected or information regarding an allocated slot.

On the other hand, the slot allocation confirmation message may be included in a second long beacon message 231 and transmitted to the child node network device 220. This may be performed when a time for transmitting the short beacon message is not sufficiently secured after the parent node network device 210 receives the first child node beacon message 260 including the slot allocation request message from the child node network device 220.

Thereafter, the child node network device 220 may receive the second short beacon message 241 including the slot allocation conformation message as indicated by 251, and check a network join association result through the received second short beacon message 241.

On the other hand, the second short beacon message 241 may include a free slot list, as well as the slot allocation confirmation message. At this time, a child node network device (not shown) other than the child node network device 220 that has transmitted the slot allocation request message may check the free slot list included in the second short beacon message 241 and determine a timing at which the slot allocation request message is to be transmitted.

As described above, the child node network device 220 may receive prompt scheduling update information through the first short beacon message 240 and the second short beacon message 241, without waiting for the long beacon interval 280.

According to an embodiment, the parent node network device 210 may vary transmission intervals 290 and 295 of the short beacon messages 240, 241, 243, and 245 and the number of transmissions according to QoS of the network. For example, when the number of the child node network devices 220 that want to join the network is large, the parent node network device 210 may shorten the transmission intervals 290 and 295 of the short beacon messages 240, 241, 243, and 245, and increase the number of transmissions of the short beacon messages 240, 241, 243, and 245. On the other hand, when the network is stabilized and does not have movement, the parent node network device 210 may lengthen the transmission intervals 290 and 295 of the short beacon messages 240, 241, 243, and 245 and reduce the number of transmission of the short beacon messages 240, 241, 243, and 245. Thus, the parent node network device 210 may variably operate the transmission intervals 290 and 295 and the transmission number of the short beacon messages 240, 241, 243, and 245 according to QoS of the network.

On the other hand, the parent node network device 210 may differently set the transmission intervals 290 and 295 between the short beacon messages 240, 241, 243, and 245 according to QoS of the network. For example, at the timing when the parent node network device 210 transmits the first long beacon message 230, the number of the child node network devices 220 that want to join the network may not be large. At this time, the parent node network device 210 may set the first short beacon interval 290 for transmitting the first short beacon message 240 to be long. Also, after the parent node network device 210 transmits the first short beacon message 240, the number of the child node network devices 220 that want to join the network may be increased. In this case, the parent node network device 210 may shorten the second short beacon interval 295 for transmitting the second short beacon message 241 to be shorter than the first short beacon interval 290.

Also, according to an embodiment, the parent node network device 210 may operate a negotiation timing with the child node network device 220 that has transmitted the slot allocation request message according to QoS. At this time, the QoS may include a path minimizing latency, a routing path maximizing reliability, and a routing path minimizing energy consumption.

For example, when a network starts first, the parent node network device 210 may equally distribute congested network join request traffic and allocate the number of child node network devices participating in every predetermined interval. That is, the parent node network device 210 may set a join zone according to identification information (for example, ID) of a child node network device. Or, the parent node network device 210 may determine a message transmission order of child node network devices 220 for a routing path that is able to minimize a transmission time delay. Or, the parent node network device 210 may perform scheduling with high reliability by increasing the transmission number of the short beacon messages 240, 241, 243, and 245 or increasing the transmission number of the slog allocation request message (that is, the first child node beacon message 260) of the child node network devices 220.

For this purpose, the parent node network device 210 may set scheduling including at least one of the transmission number of the dynamically short beacon messages 240, 241, 243, and 245, the transmission interval of the short beacon messages 240, 241, 243, and 245, and a timing (that is, a free slot list) for the child node network device 220 to transmit a message, with reference to the slot allocation request message included in the first child node beacon message 260 transmitted by the child node network device 220. Also, the parent node network device 210 may set a timing for transmitting the first child node beacon message 260 including the slot allocation request message by each child node network device 220 according to QoS.

On the other hand, the network devices 210 and 220 according to an embodiment of the present invention may delete the negotiated scheduling through the short beacon messages 240, 241, 243, and 245. This is to flexibly handle whether the child node network device 220 to maintain connection according to a network situation, when QoS requested by the child node network device 220 is not satisfied.

The child node network device 220 may receive the fourth short beacon message 245 as indicated by 255 from the parent node network device 210. At this time, when the child node network device 220 wants to be released from the connection to the network, the child node network device 220 may transmit the second child node beacon message 265 to the parent node network device 210. At this time, the second child node beacon message 265 may include a slot deallocation request message including information that the child node network device 220 requests release of the connection to the network, that is, slot deallocation.

In this case, the child node network device 220 may check an interval without a message collision and transmit the second child node beacon message 265 including the slot deallocation request message to the parent node network device 210, with reference to the free slot list included in the fourth short beacon message 245.

Thereafter, the parent node network device 210 may receive the second child node beacon message 265 as indicated by 275 from the child node network device 220, analyze the slot deallocation request information, and determine whether the child node network device 220 is permitted to release network join.

The parent node network device 210 may transmit a slot deallocation confirmation message including information regarding slot deallocation to the child node network device 220. At this time, as illustrated in FIG. 2, the slot deallocation confirmation message may be included in the third beacon message 233 and transmitted to the child node network device 220. This may be performed when a sufficient time for transmitting the short beacon message again is not secured after the parent node network device 210 receives the second child node beacon message 265 including the slot deallocation request message from the child node network device 220. Therefore, although not shown, according to an embodiment, the parent node network device 210 may include a slot deallocation confirmation message in a short beacon message and transmit the short beacon message to the child node network device 220.

Figure 3:
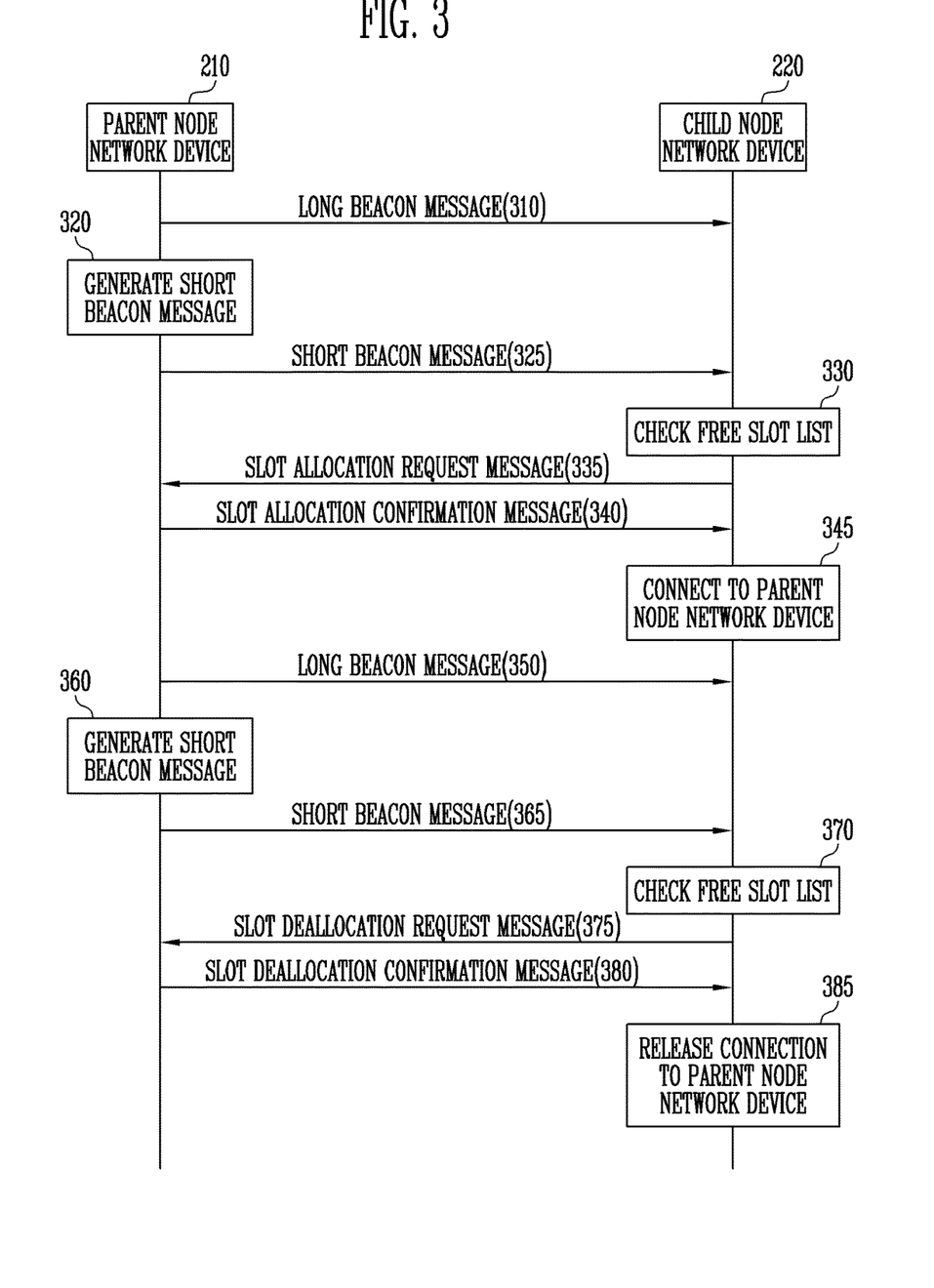
FIG. 3 is a flow chart illustrating a network join method of a network device according to an embodiment of the present invention.

FIG. 3 is a flow chart illustrating a network join method of a network device according to an embodiment of the present invention.

Referring to FIG. 3, the parent node network device 210 may transmit a long beacon message to the child node network device 220 in step 310. At this time the long beacon message may include information regarding a transmission timing of a short beacon message to be transmitted after the long beacon message.

In step 320, the parent node network device 210 may generate a short beacon message. The short beacon message may include a free slot list. At this time, the parent node network device 210 may set the free slot list according to QoS of the network.

Thereafter, in step 325, the parent node network device 210 may transmit the short beacon message generated in step 320 to the child node network device 220. At this time, the child node network device 220 may receive the short beacon message by using information regarding a transmission timing of the short beacon message included in the long beacon message received in step 310.

In step 330, the child node network device 220 may check the free slot list included in the short beacon message. Also, the child node network device 220 may check time information regarding a slot in which it is possible for the child node network device 220 to transmit a message to the parent node network device 210 without a message collision according to the free slot list.

In step 335, the child node network device 220 may transmit a slot allocation request message to the parent node network device 210 according to the checked interval in which it is possible to transmit a message. At this time, the child node network device 220 may include the slot allocation request message in a child node beacon message, and transmit the child beacon message to the parent node network device 210.

When the slot allocation request message is received, the parent node network device 210 may check whether it is possible to allocate a slot, and transmit a slot allocation confirmation message to the child node network device 220 in step 340. At this time, the slot allocation confirmation message may be included in a short beacon message and transmitted to the child node network device 220. Or, according to an embodiment, the slot allocation confirmation message may be included in a long beacon message and transmitted to the child node network device 220.

Accordingly, in step 345, the child node network device 220 may be connected to the parent node network device 210.

Thereafter, a connection state of the network may not satisfy QoS requested by the child node network device 220.

At this time, in step 350, the parent node network device 210 may transmit a long beacon message to the child node network device 220. At this time, the long beacon message may include information regarding a transmission timing of a short beacon message to be transmitted next.

In step 360, the parent node network device 210 may generate a short beacon message. The short beacon message may include a free slot list.

Thereafter, in step 365, the parent node network device 210 may transmit the short beacon message generated in step 360 to the child node network device 220. At this time, the child node network device 220 may receive the short beacon message by using the information regarding the transmission timing of the short beacon message included in the long beacon message received in step 350.

In step 370, the child node network device 220 may check the free slot list included in the short beacon message. Also, the child node network device 220 may check time information regarding a slot in which it is possible for the child node network device 220 to transmit a message to the parent node network device 210 without a message collision according to the free slot list.

In step 375, the child node network device 220 may transmit a slot deallocation request message to the parent node network device 210 according to an interval in which it is possible to transmit the message checked in step 370. At this time, the child node network device 220 may include the slot deallocation request message in a child node beacon message and transmit the child node beacon message to the parent node network device 210.

Also, when the slot deallocation request message is received, the parent node network device 210 may check whether a slot is deallocated, and transmit a slot deallocation conformation message to the child node network device 220 in step 380. At this time, the slot deallocation confirmation message may be included in a short beacon message and transmitted to the child node network device 220. Or, according to an embodiment, the slot deallocation confirmation message may be included in a long beacon message and transmitted to the child node network device 220.

Figure 4:
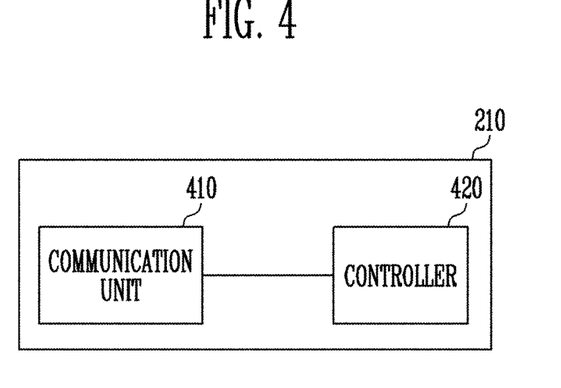
FIG. 4 is a block diagram of a parent node network device according to an embodiment of the present invention.
Figure 5:
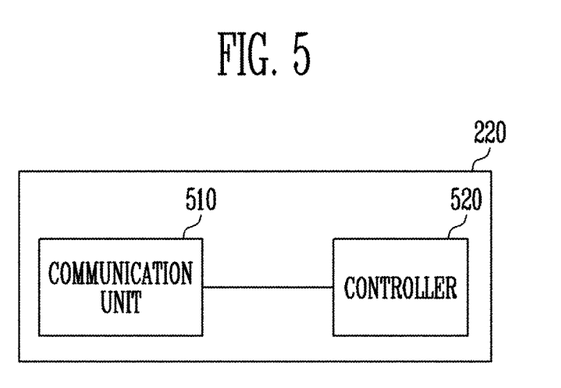
FIG. 5 is a block diagram of a child node network device according to an embodiment of the present invention.

FIG. 4 is a block diagram of a parent node network device according to an embodiment of the present invention, and FIG. 5 is a block diagram of a child node network device according to an embodiment of the present invention.

Referring to FIG. 4, the parent node network device 210 according to an embodiment of the present invention may include a communication unit 410 and a controller 420.

The communication unit 410 transmits and receives a message to and from a different network device according to any one operation of the aforementioned embodiments. For example, the communication unit 410 may transmit a long beacon message and a short beacon message to the child node network device 220, and may receive a child node beacon message from the child node network device 220.

The controller 420 may control a general operation of the parent node network device 210 to perform any one operation of the aforementioned embodiments. For example, the controller 420 may control the communication unit 410 to generate a long beacon message including information regarding a transmission timing of a short beacon message to be transmitted next and transmit the long beacon message to the child node network device 220, and control the communication unit 410 to generate a short beacon message including a free slot list and transmit the short beacon message to the child node network device 220. Also, the controller 420 may control the communication unit 410 to analyze a slot allocation request message and/or a slot deallocation request message received from the child node network device 220, determine whether to allocate a slot and/or whether to deallocate a slot, generate a corresponding response message, and transmit the response message to the child node network device 220.

Referring to FIG. 5, the child node network device 220 according to an embodiment of the present invention may include a communication unit 510 and a controller 520.

The communication unit 510 transmits and receives a message to and from a different network device according to any one operation of the aforementioned embodiments. For example, the communication unit 510 may receive a long beacon message and a short beacon message from the parent node network device 210, and may transmit a child node beacon message to the parent node network device 210.

The controller 520 may control a general operation of the child node network device 220 to perform any one operation of the aforementioned embodiments. For example, the controller 520 may control the communication unit 510 to receive a long beacon message including information regarding a transmission timing of a short beacon message to be transmitted next and receive the short beacon message according to the transmission timing of the short beacon message. Also, the controller 520 may control the communication unit 510 to receive a short beacon message including a free slot list and transmit a slot allocation request message and/or a slot deallocation request message to the parent node network device 210 according to the free slot list.

Figure 6:
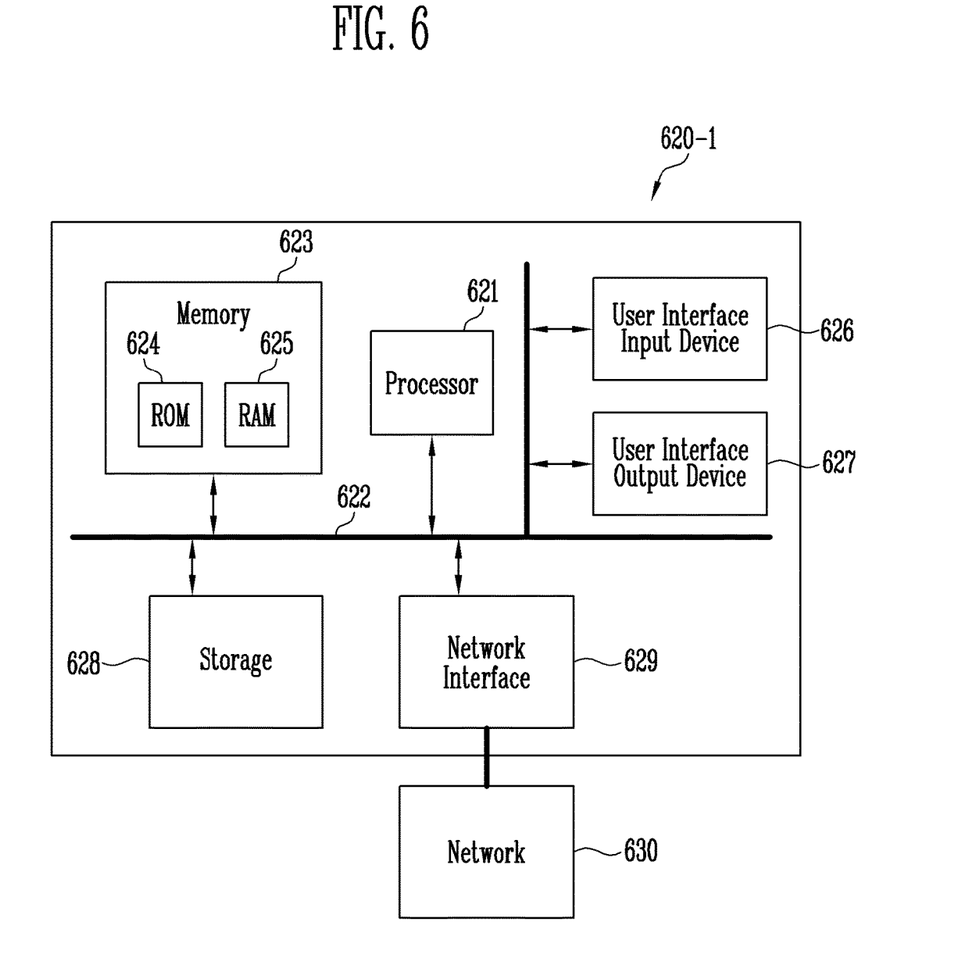
FIG. 6 is a block diagram of a computer system according to an embodiment of the present invention.

An embodiment of the present invention may be implemented in a computer system, e.g., as a computer readable medium. As shown in in FIG. 6, a computer system 620-1 may include one or more of a processor 621, a memory 623, a user input device 626, a user output device 627, and a storage 628, each of which communicates through a bus 622. The computer system 620-1 may also include a network interface 629 that is coupled to a network 630. The processor 621 may be a central processing unit (CPU) or a semiconductor device that executes processing instructions stored in the memory 623 and/or the storage 628. The memory 623 and the storage 628 may include various forms of volatile or non-volatile storage media. For example, the memory may include a read-only memory (ROM) 624 and a random access memory (RAM) 625.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

Embodiments of the present invention described in detail hereinabove are proposed for the purpose of describing particular embodiments only and not intended to be limiting of the invention. In addition to the embodiments of the present invention illustrated and described herein, it would be obvious to those skilled in the art that various other changes and modifications can be made without departing from the spirit and scope of the invention.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A network join method, comprising:
    transmitting a long beacon message including transmission timing information of a first short beacon message to a child node network device;
    transmitting the first short beacon message to the child node network device according to a transmission timing of the first short beacon message, the first short beacon message indicating an interval allocated to the child node network device;
    receiving a slot allocation request message from the child node network device according to the interval allocated to the child node network device; and
    checking whether the child node network device joins a network, and transmitting a slot allocation confirmation message to the child node network device,
    wherein an interval between the long beacon message and the first short beacon message is determined based on a quality of service (QoS) of the network, and
    wherein the interval between the long beacon message and the first short beacon message has a first length when a number of devices requesting to join the network is greater than a threshold number, and the interval between the long beacon message and the first short beacon message has a second length when the number of devices requesting to join the network is lower than the threshold number, the second length being longer than the first length.

2. The network join method of claim 1, wherein the slot allocation request message is included in a child node beacon message received from the child node network device.

3. The network join method of claim 1, wherein the slot allocation confirmation message is included in a second short beacon message transmitted to the child node network device.

4. The network join method of claim 1, further comprising:
determining the interval allocated to the child node network device according to the QoS of the network.

5. The network join method of claim 1, further comprising:
receiving a slot deallocation request message from the child node network device according to the interval allocated to the child node network device; and
checking whether the child node network device is released from the network and transmitting a slot deallocation confirmation message to the child node network device.

6. A network join method, comprising:
receiving a long beacon message including transmission timing information of a first short beacon message from a parent node network device;
receiving the first short beacon message indicating an interval allocated to a child node network device from the parent node network device according to a transmission timing of the first short beacon message;
transmitting a slot allocation request message to the parent node network device according to the interval allocated to the child node network device; and
receiving a slot allocation confirmation message indicating whether the slot allocation request message is approved from the parent node network device,
wherein an interval between the long beacon message and the first short beacon message is determined based on a quality of service (QoS) of a network, and
wherein the interval between the long beacon message and the first short beacon message has a first length when a number of devices requesting to join the network is greater than a threshold number, and the interval between the long beacon message and the first short beacon message has a second length when the number of devices requesting to join the network is lower than the threshold number, the second length being longer than the first length.

7. The network join method of claim 6, wherein the slot allocation request message is included in a child node beacon message transmitted to the parent node network device.

8. The network join method of claim 6, wherein the slot allocation confirmation message is included in a second short beacon message received from the parent node network device.

9. The network join method of claim 6, wherein the interval allocated to the child node network device is determined according to the QoS of the network.

10. The network join method of claim 6, further comprising:
transmitting a slot deallocation request message to the parent node network device according to the interval allocated to the child node network device; and
receiving a slot deallocation confirmation message from the parent node network device, the slot deallocation confirmation message confirming whether the child node network device is released from the network including the parent node network device.

11. A network device comprising:
a communication unit configured to transmit and receive a message to and from a different network; and
a controller configured to control the network device,
wherein the controller controls the communication unit to transmit a long beacon message including transmission timing information of a first short beacon message to a child node network device, transmit, to the child node network device, the first short beacon message indicating an interval allocated to the child node network device according to a transmission timing of the first short beacon message, receive a slot allocation request message from the child node network device according to the interval allocated to the child node network device, check whether the child node network device joins a network, and transmit a slot allocation confirmation message to the child node network device,
wherein an interval between the long beacon message and the first short beacon message is determined based on a quality of service (QoS) of the network, and
wherein the interval between the long beacon message and the first short beacon message has a first length when a number of devices requesting to join the network is greater than a threshold number, and the interval between the long beacon message and the first short beacon message has a second length when the number of devices requesting to join the network is lower than the threshold number, the second length being longer than the first length.

12. The network device of claim 11, wherein the controller determines the interval allocated to the child node network device according to the QoS of the network.

* * * * *